US007640335B1

(12) United States Patent
Agrawal et al.

(10) Patent No.: US 7,640,335 B1
(45) Date of Patent: Dec. 29, 2009

(54) USER-CONFIGURABLE NETWORK ANALYSIS DIGEST SYSTEM AND METHOD

(75) Inventors: Amreesh Agrawal, Dallas, TX (US); Amit Kansal, Dallas, TX (US); Monis Mohammed, Dallas, TX (US); Peter O. Schmitz, Nettetal (DE)

(73) Assignee: McAfee, Inc., Santa Clara, CA (US)

( * ) Notice: Subject to any disclaimer, the term of this patent is extended or adjusted under 35 U.S.C. 154(b) by 703 days.

(21) Appl. No.: 10/045,989

(22) Filed: Jan. 11, 2002

(51) Int. Cl.
*G06F 15/173* (2006.01)

(52) U.S. Cl. ...................................... 709/224; 709/217

(58) Field of Classification Search ................. 709/224, 709/217; 370/245
See application file for complete search history.

(56) References Cited

U.S. PATENT DOCUMENTS

| | | | | |
|---|---|---|---|---|
| 5,812,529 A | * | 9/1998 | Czarnik et al. | 370/245 |
| 5,894,311 A | * | 4/1999 | Jackson | 345/440 |
| 6,278,694 B1 | * | 8/2001 | Wolf et al. | 370/253 |
| 6,578,077 B1 | * | 6/2003 | Rakoshitz et al. | 709/224 |
| 6,631,402 B1 | * | 10/2003 | Devine et al. | 709/217 |
| 6,681,232 B1 | * | 1/2004 | Sistanizadeh et al. | 707/104.1 |
| 6,792,458 B1 | * | 9/2004 | Muret et al. | 709/224 |
| 2002/0046273 A1 | * | 4/2002 | Lahr et al. | 709/224 |
| 2002/0095387 A1 | * | 7/2002 | Sosa et al. | 705/65 |
| 2003/0053455 A1 | * | 3/2003 | Kryskow, Jr. | 370/389 |
| 2003/0074606 A1 | * | 4/2003 | Boker | 714/42 |

FOREIGN PATENT DOCUMENTS

WO      WO 99/09492        *    2/1999

OTHER PUBLICATIONS

WatchMark Corporation, "WatchMark Prospect Performance Management Product", www.watchmark.com, 2002.
Welcome to Web Log Analyzer Analysis, http://www.log-analyzer.net/faq.htm.

* cited by examiner

*Primary Examiner*—Ario Etienne
*Assistant Examiner*—Uzma Alam
(74) *Attorney, Agent, or Firm*—Zilka-Kotab, PC

(57) ABSTRACT

A system, method and computer program product are provided for user-configured network analysis reporting. Initially, pluralities of templates are identified which are provided based on user input. Then, a database is queried for network traffic information based on the identified templates. The templates are then populated with the network traffic information and stored on disc (i.e. WEB Server directories, etc.). Next, the network traffic information is available for viewing over a network utilizing the final documents, which are a result of the populated templates.

21 Claims, 9 Drawing Sheets

Tutorial, Chapter 7

This reports belongs to date: 08/10/2001.

It can also be formatted as: August, 10 2001

This is the basic method to display the top 5 records

1) Atlanta
2) Backbone1
3) Backbone2

There is also a dynamic way to display records.
This is useful, when checking for all records, which fullfil a certain criteria,
but limit the maximum number of possible records.

1) Atlanta
2) Backbone1
3) Backbone2

This is an other way to format the data output:

| Count | Segment Name |
|---|---|
| 1 | Atlanta |
| 2 | Backbone1 |
| 3 | Backbone2 |

FIG. 5B

USER-CONFIGURABLE NETWORK ANALYSIS DIGEST SYSTEM AND METHOD

FIELD OF THE INVENTION

The present invention relates to network analysis, and more particularly to reporting on network analysis.

BACKGROUND OF THE INVENTION

Numerous tools have been developed to aid in network management involving capacity planning, fault management, network monitoring, and performance measurement. One example of such tools is the network analyzer.

In general, a "network analyzer" is a program that monitors and analyzes network traffic, detecting bottlenecks and problems. Using this information, a network manager can keep traffic flowing efficiently. A network analyzer may also be used to capture data being transmitted on a network. The term "network analyzer" may further be used to describe a program that analyzes data other than network traffic. For example, a database can be analyzed for certain kinds of duplication. One example of a network analyzer is the SNIFFER® analyzer device manufactured by NETWORK ASSOCIATES, INC®.

Network analyzers are often capable of collecting a vast array of network traffic information which may be monitored and analyzed. Unfortunately, the more complex a network scenario is, the sooner a network manager gets overloaded by all of the collected information. Trying to deal with such large amount of information while attempting to focus on the right issues can be quite troublesome.

There is thus a need for a tool to make the process of receiving, organizing and analyzing network traffic information easier, faster, and more focused on a user's needs.

DISCLOSURE OF THE INVENTION

A system, method and computer program product are provided for user-configured network analysis reporting. Initially, pluralities of templates are identified which are provided based on user input. Then, a database is queried for network traffic information based on the identified templates. The templates are then populated with the network traffic information and stored on disc (i.e. WEB Server directories, etc.). Next, the network traffic information is available for viewing over a network utilizing the final documents, which are a result of the populated templates.

Two different processes may be available to create customized reports for reporting purposes. Both use similar code, but work on different types of templates (i.e. first and second type). A first process is called "WARE," which stands for Web Automated Reporting Engine. WARE reads parameter files. It opens web page templates, queries for specific information from the database to populate the web page template with the required information. A new document is thus created with a plurality of placeholders replaced with real data. Such document is stored at a parameter-specific location in memory.

A second process is called CARE, which stands for Crystal™ Automated Reporting Engine. CARE also reads parameter files. It has an application program interface (API) for interfacing a conventional Crystal™ system. In use, a Crystal™ report template is opened, and CARE takes the information of the parameter file to feed into the Crystal™ system. Requested reports are created and automatically stored at a parameter-specific location in memory.

A graphical user interface (GUI) is provided to easily create and edit the parameter files, which may control the CARE and WARE processes. Both processes, CARE and WARE, can either run by a scheduler or manually by user control.

A flexible system is thus afforded to provide users from a network manager level up to the chief information officer (CIO) with the exact type of reports they need to control and run their network business. Every day they can receive their reports with the same layout, but current information.

The information may be stored in static files. This offers a very easy way to save and share reports by simply uploading complete directories on a CD or DVD. These can later be viewed completely independent from the creation system.

The network manager, for whom these customized reports are created, may see every day the exact and preferred layout of his or her report.

BRIEF DESCRIPTION OF THE DRAWINGS

FIG. 5B illustrates an exemplary output file, created by WARE.

DESCRIPTION OF THE PREFERRED EMBODIMENTS

Figure 1:
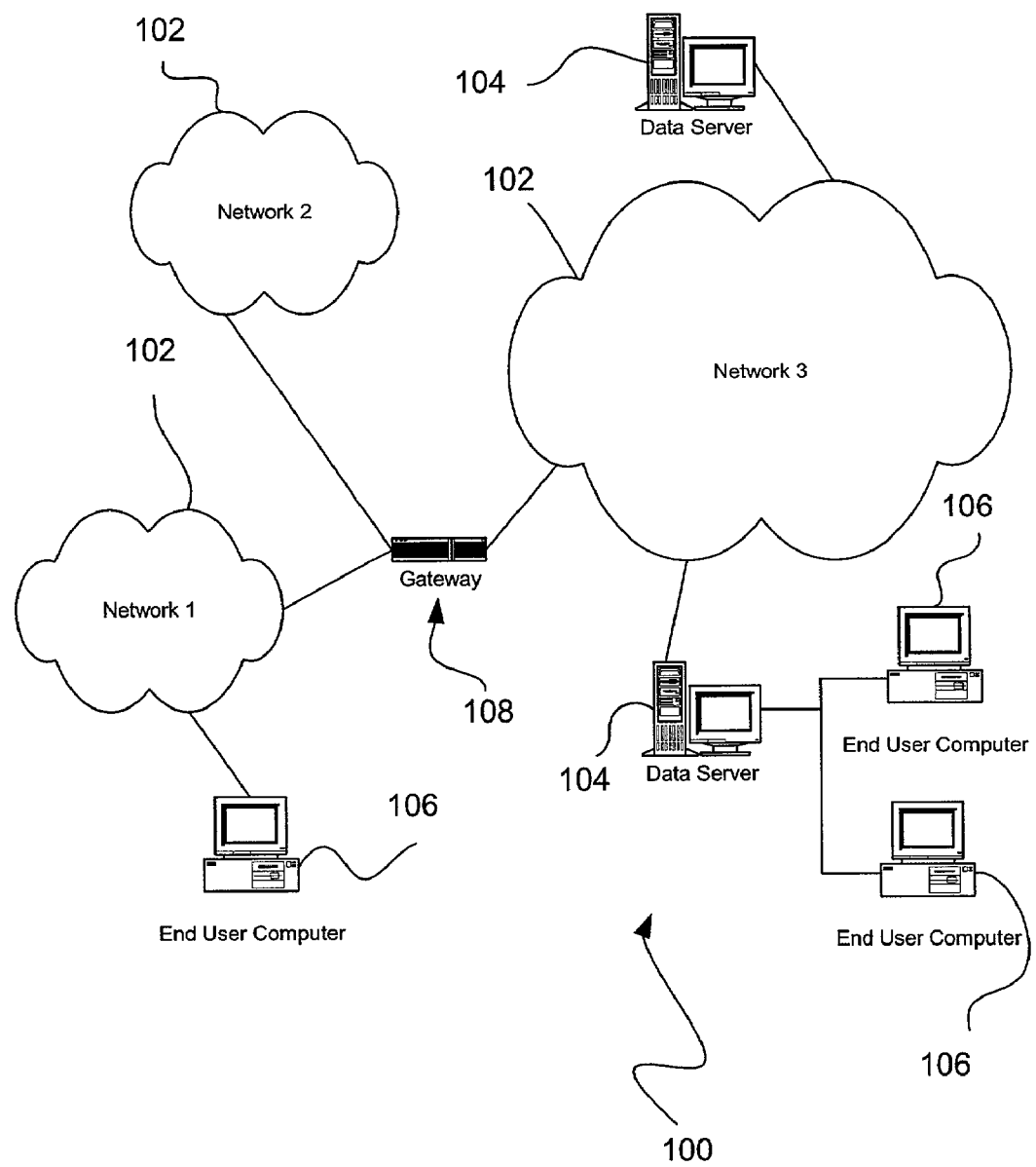
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In the context of the present description, a computer may refer to any web server, desktop computer, lap-top computer, handheld computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Coupled to any one of the foregoing components and/or segments may be a network analyzer. One exemplary network analyzer that may be used is the SNIFFER® analyzer device manufactured by NETWORK ASSOCIATES, INC®. In use, the network analyzer is adapted for monitoring and analyzing network traffic, detecting bottlenecks and problems. In addition to or instead of such functionality, the network analyzer may be adapted for user-configurable network analysis reporting.

Initially, a plurality of templates are identified which are provided based on user input. This may be accomplished by creating new templates or selecting pre-existing templates before or at the time of reporting.

Then, a database is queried for network traffic information based on the identified templates. The templates are then populated with the network traffic information and stored on WEB server directories. Next, the network traffic information is reported over a network utilizing the populated templates.

By this design, a user may focus the reporting and analysis of collected network traffic information in way that removes superfluous and/or irrelevant information. More information relating to an exemplary application of the foregoing principles will be set forth hereinafter in greater detail.

Figure 2:
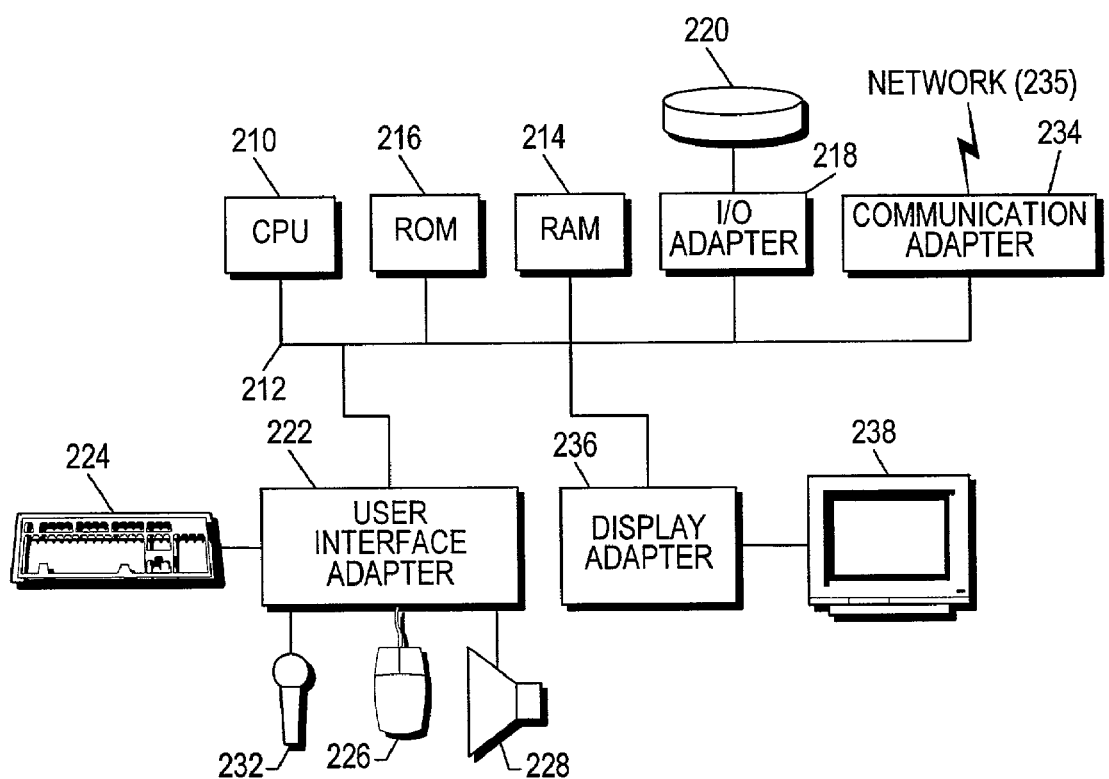
FIG. 2 shows a representative hardware environment that may be associated with the data servers and computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a tangible computer readable medium (e.g. a Random Access Memory (RAM) 214, Read Only Memory (ROM) 216), an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
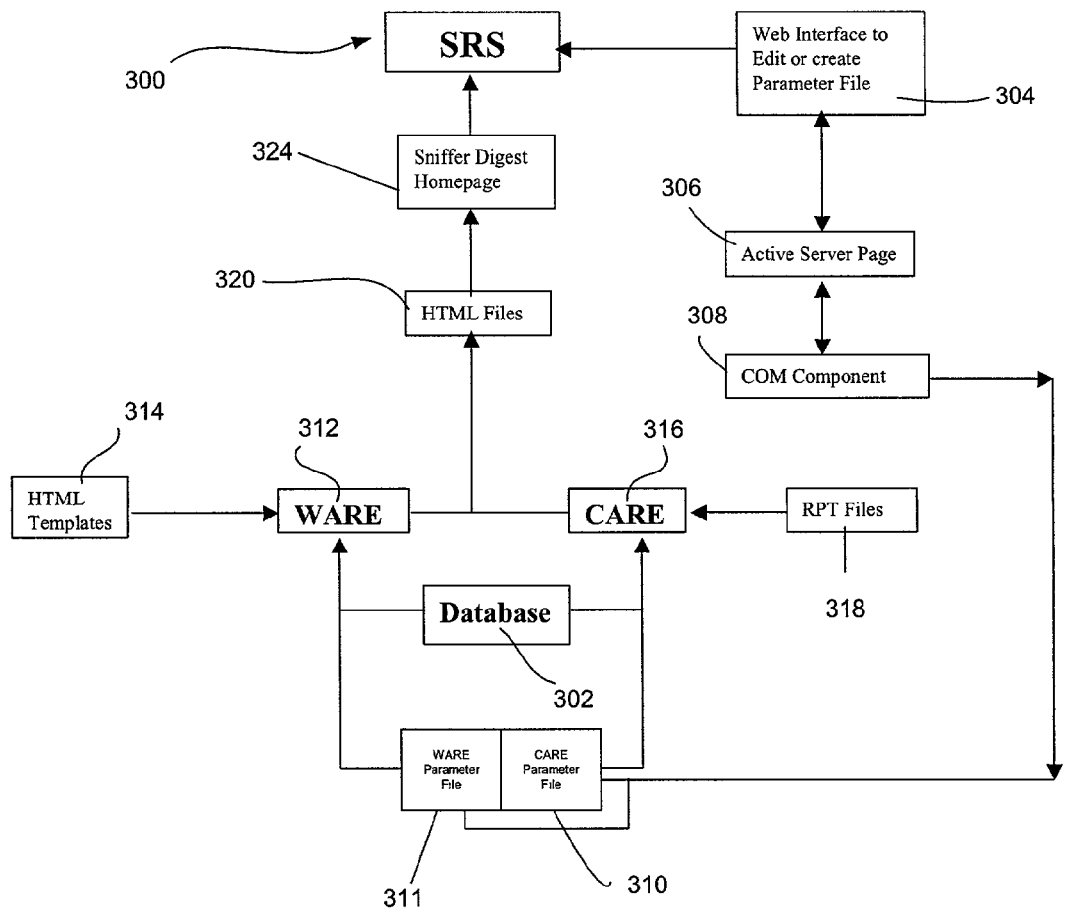
FIG. 3 illustrates an exemplary architecture for user-configurable reporting, in accordance with one embodiment.

FIG. 3 illustrates an exemplary architecture. 300, which can be implemented on a Network Associates® Sniffer® reporting server, presents an overall reporting system and graphical user interface (GUI), in accordance with one embodiment. All general functions may be available (but not exclusive) through this interface.

A database 302 may be provided which is consistently populated with network traffic information. In the context of the present description, such network traffic information may include any information relating to communications over a network. The population of the database 302 may be accomplished in any desired manner. For example, a plurality of remote monitoring (RMON) agents may be used to create "csv" files (i.e. comma separated value files). In use, the agents continuously write data into csv files. These csv files may then be used to populate the database 302. Typically, in every time interval, which can be minutes, hours, or days; new statistical data may be imported in the database 302.

It should be noted that the database 302 includes a plethora of information including first portions that may be relevant to a first user, second portions that may be relevant to a second user, and so forth. As will soon become apparent, the present architecture 300 allows a user to configure the manner in which the network traffic information is extracted from the database 302 and reported.

A Web Automated Reporting Engine (WARE) process 312 works on parameter files 311 which can look like the one shown in Table #1. A detailed description will follow later.

TABLE 1

[DATABASE] Access_User
[INPUT] . . . \reports\[DATE]\chapter7.htm
[EXPORT] . . . \reports\:YEAR:_:MONTH:_:DAY:\
[DATEFORMAT] %m/%d/%Y
[PARAMETERS]
:DATE: 08/07/2001
:SQL_Q1: Select segment from segments where time >=
CDate(':DATE: 00:00:00') and time <=CDate(':DATE: 23:59:59')
group by segment order by segment asc
:SQLOUT: REC_NR,SEGMENT Based on all of this information, the WARE process 312 reads a template 314, which may be a standard web file and includes several placeholders. The WARE process 312 may replace the placeholders with real dates and updated information, queried from the database 302. A new updated file 320 is now stored in some directory, which name can also be built of variables like a date, a segment, or report type. A special Sniffer® Digest Homepage 324 can now refer to this predefined structure of the reports and their locations.

A Cystal™ Automated Reporting Engine (CARE) process 316 works on parameter files 310, which can look like the one shown in Table #2. A detailed description will follow later.

TABLE 2

[REPORT] d:\reports\crystaltemplates\report.rpt
[EXPORT] d:\reports\:YEAR:_:MONTH:_:DAY:\:SEGMENT:\:HOST:\default .htm
[SELECT] {HOSTS.Host} = ":HOST:" and
{HOSTS.Time} in DateTime (:YEAR:,:MONTH:,:DAY:,00, 00, 00) to DateTime (:YEAR:,:MONTH:,:DAY:,23, 59, 59) and
{HOSTS.Segment} = ":SEGMENT:"
[DATEFORMAT] %Y-%m-%d
[PARANETERS]
:DATE: 2001-08-1
:DATE: 2001-08-2
:DATE: 2001-08-3
:SEGMENT: Dallas
:SEGMENT: NewYork
:SEGMENT: NewYork-Atlanta
:SEGMENT: Dallas-Atlanta
:HOST: WEBServer1
:HOST: SAPServer1

Based on this information, the CARE process 316 connects with a programming interface to a Crystal™ library. It then forwards the Crystal™ report template, which may be a RPT file 318, and several parameters to a Crystal™ system for report generation. This way, the report can be narrowed down to only show the required information. The parameters, which CARE transfers to the Crystal™ system, can either be static values from the parameter file 310, or result from some query into the database 302. The Crystal™ system saves the report as some web accessible files 320, which can be, for example, HTML files. A special Sniffer® Digest Homepage 324 can now refer to this predefined structure of the reports and their locations.

In one embodiment, the templates may be selected and tailored by the user. Such templates may include any data structure capable of dictating the manner in which the network traffic information is extracted from the database 302, and/or reported to the user. To accomplish this, an interface 304 is provided for allowing a user to select reporting parameters which, in turn, determine the appropriate template.

In the context of the present description, a parameter may include any aspect of network traffic information reporting that may be configured by a user. Just by way of example, the parameters may include which network segments should be reported (i.e. which tier of network segments, etc.), a format of the reporting (i.e. pie-chart, graphs, customizable templates, etc.) or the like. Further, the parameters may indicate where the network traffic information comes from, what type of network traffic information is used, to what location the network traffic information is written, etc. Still yet, the parameters may indicate the time and period at which various template fields are populated.

An active server page 306 may be used for delivering the parameters from the user to a particular predetermined server. Further, a COM component 308 may be used to validate the parameters provided by the user to make sure the data is correct in a parameter file which is stored for subsequent use. Table #1 and table #2 illustrate two exemplary files 310 and 311 indicating a plurality of exemplary parameters.

Figure 4:
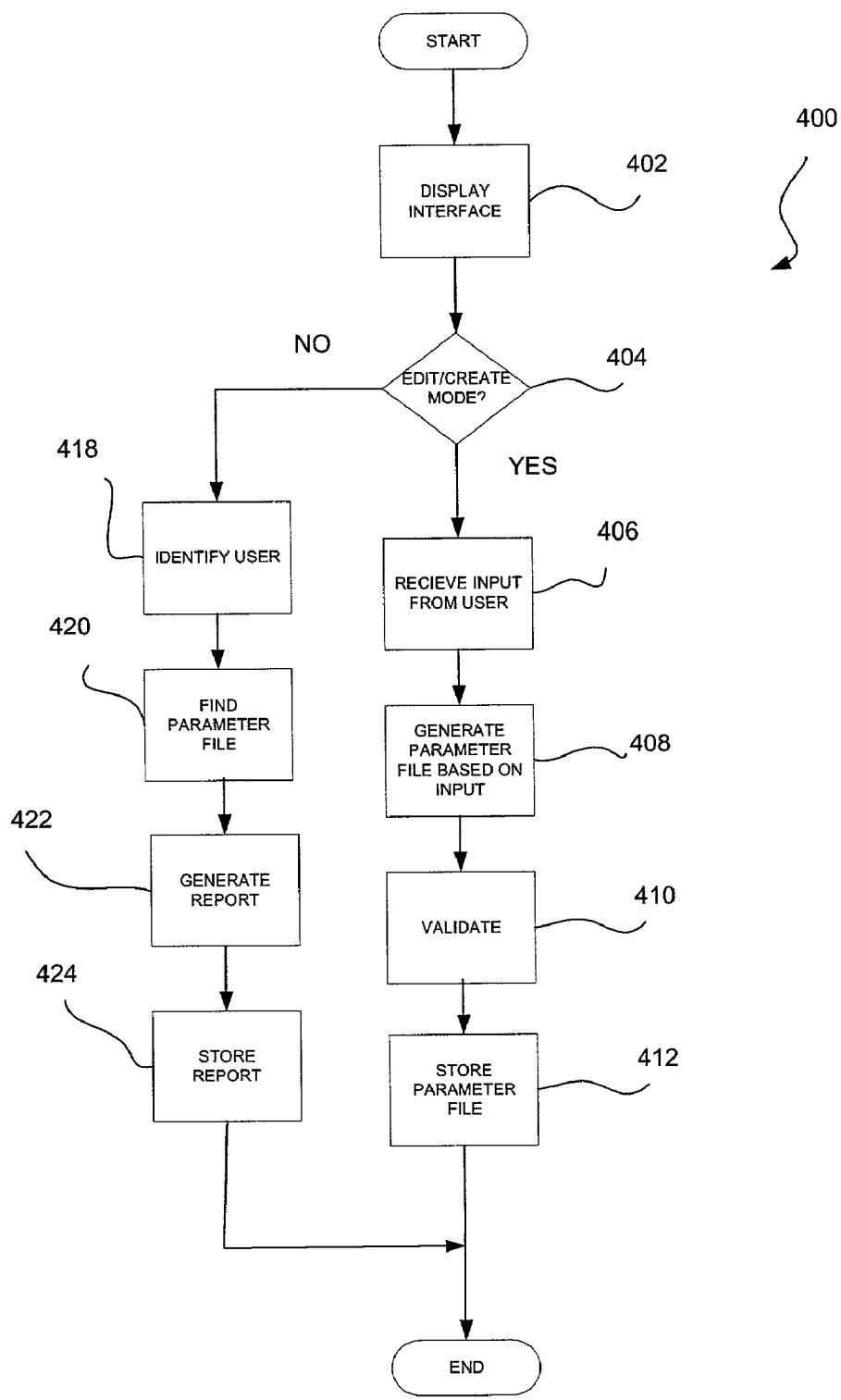
FIG. 4 illustrates a method for user-configurable network analysis reporting, in accordance with one embodiment.

FIG. 4 illustrates a method 400 for user-configurable network analysis reporting, in accordance with one embodiment. As an option, the present method 400 may be carried out in the context of the architecture 300 set forth in FIG. 3. Of course, the present method 400 may be carried out in any desired context.

As shown, an interface is displayed in operation 402. Such interface may include a network analysis reporting interface homepage like that mentioned earlier, or any other desired interface. Using such interface, a user may indicate whether he or she desires to operate in an edit mode or a report mode. See decision 404. This may be accomplished by simply selecting various icons, defaulting in the report mode unless a user action indicates otherwise, etc.

If the method 400 is to operate in an edit mode, input is then received from a user. See operation 406. Such input may take the form of the various parameters mentioned hereinabove. Of course, the input may take any form.

Next, a parameter file is generated based on the input in operation 408. The contents of the parameter file may be validated with, for example, a COM component similar to that set forth during reference to FIG. 3. Note operation 410. In operation 412, the parameter file is stored for immediate or subsequent use.

If, on the other hand, the method 400 is to operate in a report mode, a user may be identified in operation 418. This may be accomplished utilizing a cookie, or an explicit password entry, etc. Once the user is identified, a parameter file may be located in operation 420. This may be accomplished automatically based on the identity of the user, or via a manual selection process. Next, the report is generated in operation 422 and stored for later viewing access in 424.

Two different modes of report creation (418, 420, 422 and 424) are possible. Both are very useful in their specific environments:

An automatic or scheduled report creation mode may run, for example, every morning before the users come to the office. This is an easy way to create daily reports, based on previous data.

A manual mode may take dedicated dates to create the required reports. This may be a typical environment for Baselining projects, handled by some consultants. They save all network related data in a database. Later, they create the specific reports for their customers. Instead of creating every single report one by one, they can create the same report for 14 days on 10 segments (140 reports in total) with one simple command line.

Sniffer® Digest Homepage 324 in FIG. 3 can thus have a link to these reports or a link to an index, where all reports are referenced.

Figure 5:
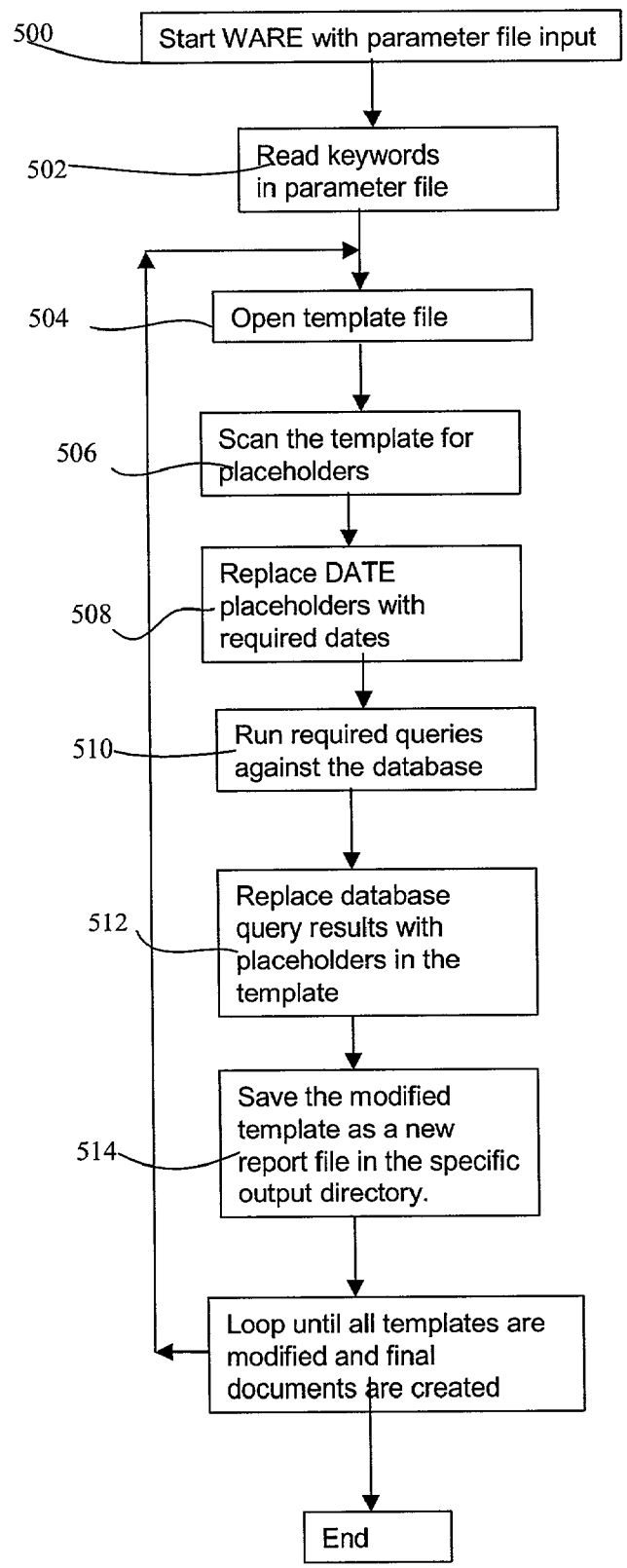
FIG. 5 illustrates a method for generating a user configurable report with a Web Automated Reporting Engine (WARE), in accordance with operation 422 of FIG. 4.

FIG. 5 illustrates a method 500 how the WARE process 312 operates by using templates to create final documents, in accordance with operation 422 of FIG. 4. The WARE process 312 is started in 500 with some parameter file as input. The WARE process 312 reads all keywords in operation 502. Keywords are kept in '[' ']' and start at the beginning of as line, so that the WARE process 312 can find them. Behind every keyword, a value is written. Table #1, which shows a sample WARE parameter file, illustrates this.

Figure 5A:
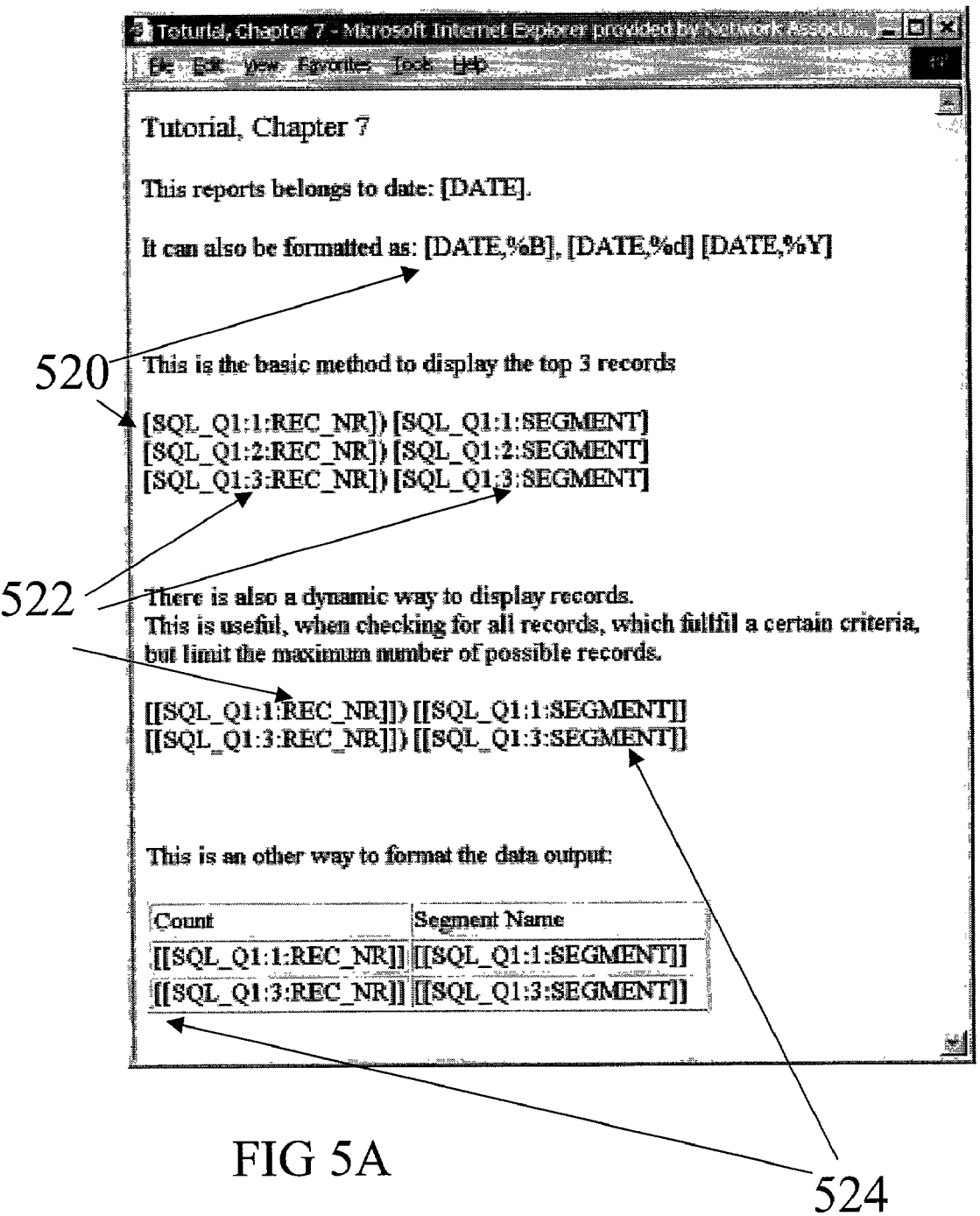
FIG. 5A illustrates an exemplary template to be used for WARE input.

Operation 504 opens the template files based on some [INPUT] keyword. Parameters, which are identified by a ':' at the beginning and the end, are used to narrow down the data selection. Operation 506 scans the template file. FIG. 5A illustrates an exemplary template file. All placeholders in the template are put into '[', ']' 520. Date placeholders are simply replaced in operation 508 with the date for which the report should run. Standard date format options are possible. Other placeholders from the template file are also replaced with information from the parameter file.

Operation 510 takes a SQL statement, which is related to a placeholder and runs this against the database. During operation 512, the results are replaced in the template. SQL statements like SQL_Q1 in Table #1 can be complex and may return several rows and columns. The related placeholders 522 in the template file also refer to the correct rows and columns to be printed. See again FIG. 5A. Another option, as shown by designator 524, allows dynamic printing of the required records in the template. This is useful, if the returned row count is not known before the query and no useless space will be occupied in the final document. A specific '[[', ']]' syntax allows the WARE process 312 to automatically create new rows with the correct layout to print the data from the database. Only the minimum and maximum rows, which should be printed if they are available, are mentioned in the template.

FIG. 5B shows the result after all replacements from FIG. 5A are done. After all the replacements are done, the new document of FIG. 5B may be saved in a location, that is specified by the output keyword. See operation 514. This operation can also use some placeholders in the output directory to be replaced with current parameters and dates.

The replacements in the template are done on visible and also invisible text like URLs. A general text replacement may be used. Therefore, also dynamic, result based links can be created automatically in the final report document. A complex set of flexible reports, linked to each other with easy user access and navigation can be the result of several WARE processes running one after the other. Different users can have different skeletons for their preferred reports and navigation.

Since the replacement may work as general text replacement, it is not only applicable for HTML files, but also for standard text, RTF and other text-based file formats.

Figure 6:
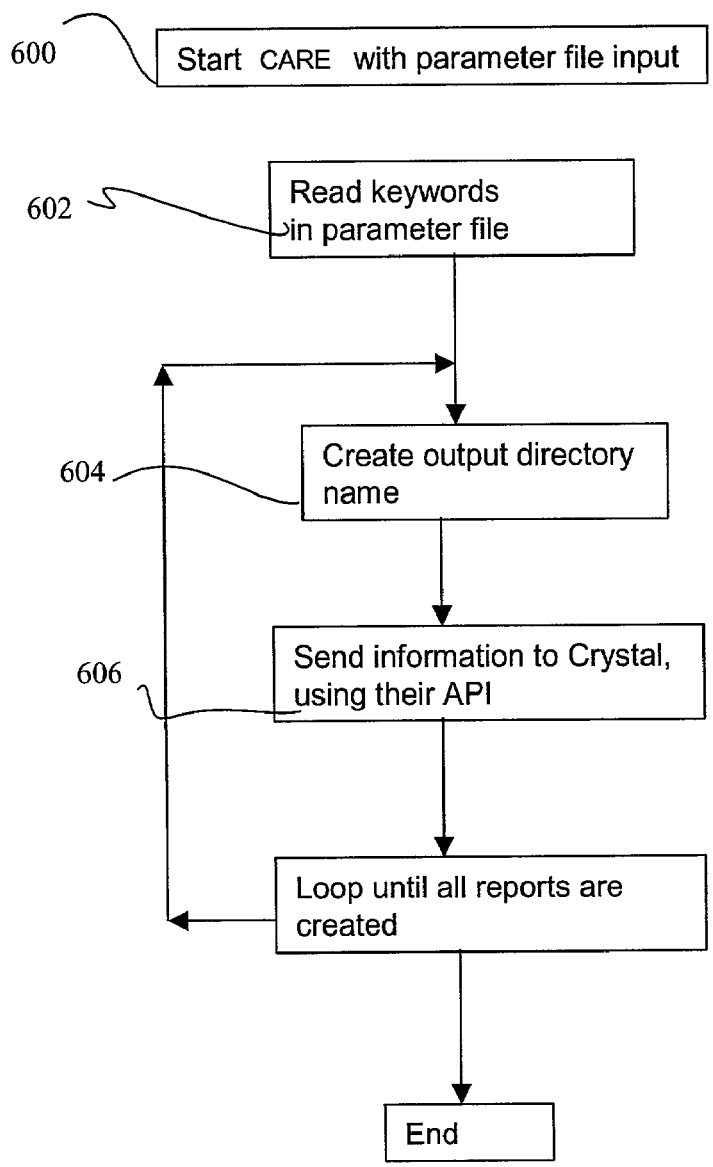
FIG. 6 illustrates a method for generating a user configurable report with a Crystal™ Automated Reporting Engine (CARE), in accordance with operation 422 of FIG. 4.

FIG. 6 illustrates a method 600 showing how the CARE process 316 operates by using some Crystal™ report templates. The CARE process 316 is started in 600 with some parameter file as input. The CARE process 316 reads all keywords in operation 602. Keywords are kept in '[' ']' and start at the beginning of as line, so that CARE can find them. Behind every keyword a value is written. Table #2, which shows a sample CARE parameter file, illustrates this.

After the keyword PARAMETERS, the section that keeps all the parameters follows, which is used to feed into Crystal™ Reports. The keyword REPORT points to a Crystal™ report template, which was earlier designed with a Crystal™ report designer and now needs to be filled with current data. The SELECT keyword is used to control the data query, which Crystal™ will run against the database. This query can include several parameters, which are also found in the PARAMETERS section. Operation 604 creates the output directory, based on parameters, which are found in the PARAMETERS section of the parameter file.

All information is then sent in operation 606 through the Crystal™ API into the Crystal™ system for automated creation of the report. This involves the specific source location of the template, the destination location of the final report and any kind of information to customize the report. All of this is found in a parameter file as shown in Table #2. Different parameters can be used for looping and nesting. Table #3 shows the names of the directories, which may be automatically created based on the PARAMETERS of Table #2.

TABLE 3

D:\reports\2001_08_01\Dallas\WEBServer1\default.htm
D:\reports\2001_08_02\Dallas\WEBServer1\default.htm
D:\reports\2001_08_03\Dallas\WEBServer1\default.htm
D:\reports\2001_08_01\Dallas\SAPServer1\default.htm
D:\reports\2001_08_02\Dallas\SAPServer1\default.htm
D:\reports\2001_08_03\Dallas\SAPServer1\default.htm
D:\reports\2001_08_01\NewYork\WEBServer1\default.htm
D:\reports\2001_08_02\NewYork\WEBServer1\default.htm
D:\reports\2001_08_03\NewYork\WEBServer1\default.htm
D:\reports\2001_08_01\NewYork\SAPServer1\default.htm
D:\reports\2001_08_02\NewYork\SAPServer1\default.htm
D:\reports\2001_08_03\NewYork\SAPServer1\default.htm
D:\reports\2001_08_01\NewYork-Atlanta\WEBServer1\default.htm
D:\reports\2001_08_02\NewYork-Atlanta\WEBServer1\default.htm
D:\reports\2001_08_03\NewYork-Atlanta\WEBServer1\default.htm
D:\reports\2001_08_01\NewYork-Atlanta\SAPServer1\default.htm
D:\reports\2001_08_02\NewYork-Atlanta\SAPServer1\default.htm
D:\reports\2001_08_03\NewYork-Atlanta\SAPServer1\default.htm
D:\reports\2001_08_01\Dallas-Atlanta\WEBServer1\default.htm
D:\reports\2001_08_02\Dallas-Atlanta\WEBServer1\default.htm
D:\reports\2001_08_03\Dallas-Atlanta\WEBServer1\default.htm
D:\reports\2001_08_01\Dallas-Atlanta\SAPServer1\default.htm
D:\reports\2001_08_02\Dallas-Atlanta\SAPServer1\default.htm
D:\reports\2001_08_03\Dallas-Atlanta\SAPServer1\default.htm Table #4 shows an example of a simple nested parameter file. The resulting directory structure is shown in Table #5.

TABLE 4

[REPORT] d:\reports\crystaltemplates\report.rpt
[EXPORT]d:\reports\:YEAR:_:MONTH:_:DAY:\:SEGMENT:\DLCI_:DLCI:\:HOST:\default.htm
[SELECT] {HOSTS.Host} = ":HOST:" and
    {HOSTS.Time} in DateTime (:YEAR:,:MONTH:,:DAY:,00, 00, 00) to DateTime (:YEAR:,:MONTH:,:DAY:,23, 59, 59) and
    {HOSTS.Segment} = ":SEGMENT:" and
    {HOSTS.DLCI} = ":DLCI:"
[DATEFORMAT] %Y-%m-%d
[PARAMETERS]
:DATE: 2001-08-1
:DATE: 2001-08-2

TABLE 4-continued

:SEGMENT: Dallas
+:DLCI: 161
++:HOST: WEBServer1
++:HOST: WEBServer2
+:DLCI: 163
++HOST: SAPServer1
:SEGMENT: NewYork
+:DLCI: 176
++HOST: WEBServer1
+:DLCI: 177
++HOST: SAPServer1
++HOST: SAPServer2

TABLE 5 d:\reports\2001_08_01\Dallas\DLCI_161\WEBServer1\default.htm
d:\reports\2001_08_01\Dallas\DLCI_161\WEBServer2\default.htm
d:\reports\2001_08_01\Dallas\DLCI_163\SAPServer1\default.htm
d:\reports\2001_08_01\NewYork\DLCI_176\WEBServer1\default.htm
d:\reports\2001_08_01\NewYork\DLCI_177\SAPServer1\default.htm
d:\reports\2001_08_01\NewYork\DLCI_177\SAPServer2\default.htm
d:\reports\2001_08_02\Dallas\DLCI_161\WEBServer1\default.htm
d:\reports\2001_08_02\Dallas\DLCI_161\WEBServer2\default.htm
d:\reports\2001_08_02\Dallas\DLCI_163\SAPServer1\default.htm
d:\reports\2001_08_02\NewYork\DLCI_176\WEBServer1\default.htm
d:\reports\2001_08_02\NewYork\DLCI_177\SAPServer1\default.htm
d:\reports\2001_08_02\NewYork\DLCI_177\SAPServer2\default.htm Instead of having only fixed values in the PARAMETER section, some SQL query can be used to create dynamic values, which are used for report creation. One sample parameter file is shown in Table #6.

TABLE 6

[REPORT] d:\reports\crystaltemplates\report.rpt
[EXPORT]d:\reports\:YEAR:_:MONTH:_:DAY:\:SEGMENT:\DLCI_:DLCI:\:HOST:\default.htm
[SELECT] {HOSTS.Host} = ":HOST:" and
    {HOSTS.Time} in DateTime (:YEAR:,:MONTH:,:DAY:,00, 00, 00) to DateTime (:YEAR:,:MONTH:,:DAY:,23, 59, 59) and
    {HOSTS.Segment} =":SEGMENT:"
[DATEFORMAT] %Y-%m-%d
[PARAMETERS]
:DATE: 2001-08-1
:DATE: 2001-08-2
:SEGMENT: Dallas
+:SQL,3:   Select host from host_table where time >=
    CDate(':DATE: 00:00:00') and time <=
    CDate(':DATE: 23:59:59')
    group by hosts order by total_packets desc
+:SQLOUT: RECNR,HOST
:SEGMENT: NewYork
+:SQL,5:   Select host from host_table where time >=
    CDate(':DATE: 00:00:00') and time <=
    CDate(':DATE: 23:59:59')
    group by hosts order by total_packets desc
+:SQLOUT: RECNR, HOST This sample creates segment Dallas 3 reports (for the top 3 hosts) for 2 dates based on total packet counts. It also creates segment NewYork 5 reports (for the top 5 hosts) for 2 dates based on the total packet count on this segment. Since the network manager does not know the top hosts, the SQL query may make a dynamic decision, based on the current database.

Similar to the WARE process, the DATE information can either be absolute dates or relative dates, which are related to the date, when the job runs. The intention for scheduled or on-demand reports was already described in the description of FIG. 5.

Operations 604 and 606 may loop until all reports, which are a result of the different parameter combinations, are created.

Figure 7:
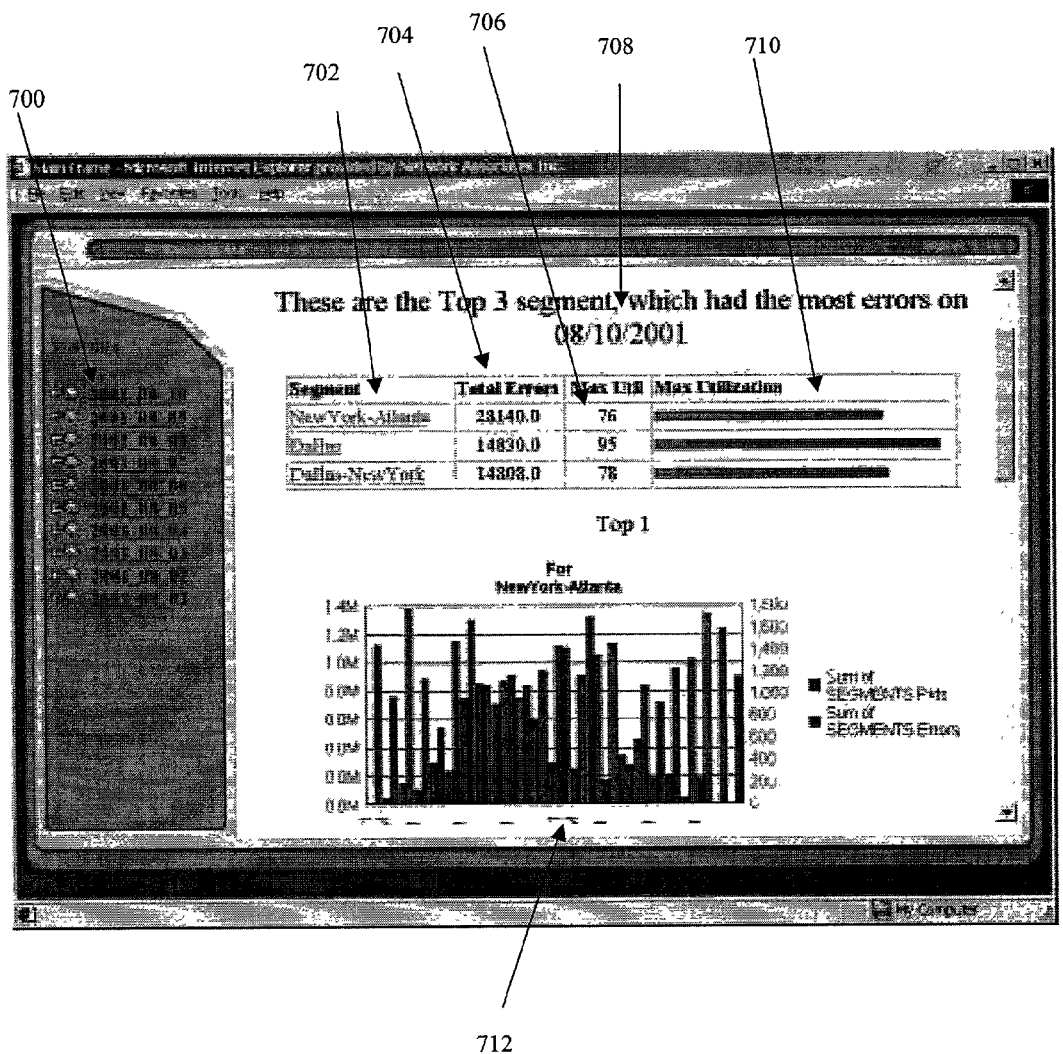
FIG. 7 illustrates an exemplary graphical user interface capable of displaying the populated templates over a network.

FIG. 7 illustrates a snapshot of a possible output, which combines the CARE and WARE-process generated reports is shown in FIG. 7. As shown, an index 700 of the last days is provided. The creation of such can be done automatically by the WARE process. Designators 702, 704, 706 and 710 show values, which are a result from a query against the database. Item 704 is used to sort the entries by errors. Items 706 and 710 offer information about the utilization. Item 706 is a printed numeric value. As designated by designator 710, a parameter for the bar size inside the html-script is replaced by the value of the utilization, which can only be a value somewhere between 0 and 100%. Item 708 is a date replacement, done by the WARE process. Item 702, which is the segment name, also has a link in the background, which points to the location of the chart 712. This link is also automatically created by the WARE process. The chart itself is the result of a CARE operation.

Different users can have different Sniffer® Digest Home-Pages, but they can all refer to a common pool of graphics, which is identified by dates, segment names and or host names. The required links are created automatically. There is no need to store all memory-consuming pictures several times. The CARE and WARE process can take care of the links and the locations.

Example

As an option, on the top left of the daily Sniffer® Digest Homepage, a graph may be shown, which prints the top five (5) error segments during the last day. Every day, the graph may be located at the same position, but the segments and their names may change based on every day's specific error occurrences.

Below this graph, a list of the top five (5) busiest servers may be shown. The list may be positioned at the same position every day, but the printed servers and their load may change. The top right of the page may show the same 'error graph' as on the top left. However, in this graph, the error count covers not only one day but always the last one week. Sniffer® Digest allows this way of customizing the reports in a very simple but effective way.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for user-configured network analysis reporting, comprising:
   (a) identifying a plurality of templates provided based on user input;
   (b) querying a database for network traffic information based on the identified templates;
   (c) populating the templates with the network traffic information; and
   (d) reporting the network traffic information over a network utilizing the populated templates;
   wherein the reporting includes displaying a graphical user interface reflecting the populated templates;
   wherein the templates are generated based on a plurality of user-configured parameters including network portions to be reported, a format of the reporting, a time or period, where the network traffic information comes from, what type of network traffic information is used, and to what location the network traffic information is written;
   wherein the templates include templates of a first type and templates of a second type;
   wherein the templates of the first type and the templates of the second type differ with respect to a format thereof.

2. The method as recited in claim 1, wherein the templates of the first type and the templates of the second type differ with respect to a versatility thereof.

3. The method as recited in claim 1, wherein the templates of the first type are populated with the network traffic information utilizing a first module.

4. The method as recited in claim 1, wherein the templates of the second type are populated with the network traffic information utilizing a second module.

5. A computer program product embodied on a tangible computer readable medium for user-configured network analysis reporting, comprising:
   (a) computer code for identifying a plurality of templates provided based on user input;
   (b) computer code for querying a database for network traffic information based on the identified templates;
   (c) computer code for populating the templates with the network traffic information; and
   (d) computer code for reporting the network traffic information over a network utilizing the populated templates;
   wherein the reporting includes displaying a graphical user interface reflecting the populated templates;
   wherein the templates are generated based on a plurality of user-configured parameters including network portions to be reported, a format of the reporting, a time or period, where the network traffic information comes from, what type of network traffic information is used, and to what location the network traffic information is written;
   wherein the templates include templates of a first type and templates of a second type;
   wherein the templates of the first type and the templates of the second type differ with respect to a format thereof.

6. The computer program product as recited in claim 5, wherein the templates of the first type and the templates of the second type differ with respect to a versatility thereof.

7. The computer program product as recited in claim 5, wherein the templates of the first type are populated with the network traffic information utilizing a first module.

8. The computer program product as recited in claim 5, wherein the templates of the second type are populated with the network traffic information utilizing a second module.

9. A system for user-configured network analysis reporting, comprising:
   (a) a server for identifying a plurality of templates provided based on user input;
   (b) the server for querying a database for network traffic information based on the identified templates;
   (c) the server for populating the templates with the network traffic information; and
   (d) the server for reporting the network traffic information over a network utilizing the populated templates;
   wherein the reporting includes displaying a graphical user interface reflecting the populated templates;

wherein the templates are generated based on a plurality of user-configured parameters including network portions to be reported, a format of the reporting, a time or period, where the network traffic information comes from, what type of network traffic information is used, and to what location the network traffic information is written;

wherein the templates include templates of a first type and templates of a second type;

wherein the templates of the first type and the templates of the second type differ with respect to a format thereof.

10. A method for user-configured network analysis reporting, comprising:
 (a) determining whether a network analysis reporting system is operating in a report mode or edit mode;
 (b) if the network analysis reporting system is operating in the report mode, identifying a plurality of existing templates;
 (c) if the network analysis reporting system is operating in the edit mode, creating a plurality of templates based on user input;
 (d) querying a database for network traffic information;
 (e) populating the templates with the network traffic information; and
 (f) reporting the network traffic information over a network utilizing the populated templates;
  wherein the reporting includes displaying a graphical user interface reflecting the populated templates;
  wherein the templates are generated based on a plurality of user-configured parameters including network portions to be reported, a format of the reporting, a time or period, where the network traffic information comes from, what type of network traffic information is used, and to what location the network traffic information is written;
  wherein the templates include templates of a first type and templates of a second type;
  wherein the templates of the first type and the templates of the second type differ with respect to a format thereof.

11. A method for user-configured network analysis reporting, comprising:
 (a) displaying an interface;
 (b) determining whether the interface is operating in a report mode or edit mode;
 (c) if the interface is operating in the edit mode:
  (i) receiving input from a user,
  (ii) generating a parameter file based on the input,
  (iii) validating the parameter file, and
  (iv) storing the parameter file; and
 (d) if the interface is operating in the report mode:
  (i) identifying a user,
  (ii) locating a parameter file, and
  (iii) generating a report based on the parameter file by:
   1) identifying templates in the parameter file,
   2) retrieving templates of a first type from a first module,
   3) retrieving templates of a second type from a second module,
   4) querying a database, and
   5) populating the templates utilizing network traffic information retrieved in response to the querying,
  (iv) displaying the populated templates;
  wherein the templates are generated based on a plurality of user-configured parameters including network portions to be reported, a format of the reporting, a time or period, where the network traffic information comes from, what type of network traffic information is used, and to what location the network traffic information is written;
  wherein the templates include templates of the first type and templates of the second type;
  wherein the templates of the first type and the templates of the second type differ with respect to a format thereof.

12. The method as recited in claim 1, wherein the reporting includes a graph displaying error segments for a predefined period of time.

13. The method as recited in claim 1, wherein the reporting includes a graph displaying a list of busiest servers for a predefined period of time.

14. The method as recited in claim 1, wherein a plurality of monitoring agents are utilized to monitor the network traffic information.

15. The method as recited in claim 14, wherein the plurality of monitoring agents write the network traffic information to files which are utilized to populate the database.

16. The method as recited in claim 15, wherein the database is populated according to a minute time interval.

17. The method as recited in claim 1, wherein the templates specify a manner in which the network traffic information is extracted from the database and a manner in which the network traffic information is reported.

18. The method as recited in claim 1, wherein the user-configured parameters are validated.

19. The method as recited in claim 1, wherein the parameters are used for looping.

20. The method as recited in claim 1, wherein another interface allows a user to select the user-configured parameters.

21. The method as recited in claim 1, wherein the time or period includes a time or period at which various template fields are populated.

* * * * *

UNITED STATES PATENT AND TRADEMARK OFFICE
CERTIFICATE OF CORRECTION

PATENT NO. : 7,640,335 B1
APPLICATION NO. : 10/045989
DATED : December 29, 2009
INVENTOR(S) : Agrawal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this

Twenty-first Day of December, 2010

David J. Kappos
*Director of the United States Patent and Trademark Office*